United States Patent [19]

Cesca et al.

[11] 4,151,110

[45] * Apr. 24, 1979

[54] ALPHA OLEFIN POLYMERIZATION CATALYST COMPRISING AN ALKYL HALIDE AND A COMBINATION PRODUCT OF TiCl₃ AND TRANSITION METAL CHLORIDE OF VANADIUM, MANGANESE, COBALT OR IRON

[75] Inventors: Sebastiano Cesca, San Donato Milanese; Alberto Greco, Dresano; Guglielmo Bertolini, Pavia; Mario Bruzzone, San Donato Milanese, all of Italy

[73] Assignee: Snamprogetti S.p.A., San Donato Milanese, Italy

[ * ] Notice: The portion of the term of this patent subsequent to Jul. 19, 1994, has been disclaimed.

[21] Appl. No.: 781,480

[22] Filed: Mar. 25, 1977

Related U.S. Application Data

[62] Division of Ser. No. 568,170, Apr. 15, 1975, abandoned.

[30] Foreign Application Priority Data

Apr. 17, 1974 [IT] Italy .............................. 21516 A/74
Jan. 10, 1975 [IT] Italy .............................. 19166 A/75

[51] Int. Cl.² ........................... C08F 4/02; C08F 4/64; C08F 4/68

[52] U.S. Cl. ................................ 252/429 C; 526/114; 526/115; 526/116

[58] Field of Search ................... 252/429 C; 526/114, 526/115, 116

[56] References Cited

U.S. PATENT DOCUMENTS

| | | | |
|---|---|---|---|
| 3,288,720 | 11/1966 | Moretti et al. .................... | 252/429 C |
| 3,308,112 | 3/1967 | Ludlum et al. ............... | 252/429 C X |
| 3,325,424 | 6/1967 | Tornquist et al. ........... | 252/429 C X |
| 3,398,130 | 8/1968 | Boor ............................. | 252/429 C X |
| 3,745,154 | 7/1973 | Kashiwa ...................... | 252/429 C X |
| 3,812,089 | 5/1974 | Tashiro et al. .............. | 252/429 C X |
| 3,859,267 | 1/1975 | Yamaguchi et al. ........ | 252/429 C X |
| 4,037,041 | 7/1977 | Cesca et al. ................. | 252/429 C X |

FOREIGN PATENT DOCUMENTS 933753 10/1955 Fed. Rep. of Germany.

*Primary Examiner*—Patrick Garvin
*Attorney, Agent, or Firm*—Morgan, Finnegan, Pine, Foley & Lee

[57] ABSTRACT

An alpha-olefin such as ethylene is polymerized in the presence of a catalyst system consisting of (1) an alkyl-halide, alkyl-derivative or hydride of a metal belonging to one of the first three groups of the periodic system and (a) the combination product of a transition metal chloride and titanium trichloride said transition metal chloride being derived from the reaction of a transition metal carbonyl and titanium tetrachloride.

7 Claims, No Drawings

ALPHA OLEFIN POLYMERIZATION CATALYST COMPRISING AN ALKYL HALIDE AND A COMBINATION PRODUCT OF TICL₃ AND TRANSITION METAL CHLORIDE OF VANADIUM, MANGANESE, COBALT OR IRON

This is a division, of application Ser. No. 568,170 filed Apr. 15, 1975 which is now abandoned.

The present invention relates to (a) a process for the polymerization of alpha-olefins, particularly of ethylene, by means of a catalytic system constituted by alkyl-halides, alkyl-derivative or hydride of a metal belonging to one of the first three groups of the periodic system and the combination of a transition metal chloride and titanium trichloride, which may be used as such or may be finely dispersed on a high superficial area material; (b) to the employed catalyst; and (c) to the method of preparing that catalyst.

It is known that the titanium halides, active from a catalytic point of view, which are generally employed in the low pressure polymerization of alpha-olefins, are prepared by reducing titanium tetrahalides with aluminum alkyls or alkyl-halides. The reaction is generally carried out in an inert atmosphere and in the presence of an inert solvent. The catalyst prepared thereby is then used together with metal alkyls for the polymerization of alpha-olefins in an organic solvent suspension under low monomer pressures.

However these titanium halides are impure because of aluminum compounds and do not show a very high catalytic activity so that the final polymer needs expensive washing operations for removing the catalytic residue. Recently methods have been proposed according to which titanium halides are carried on inorganic compounds so that polymerization catalysts are obtained having an increased efficiency.

For example there have been used, as carriers, magnesium oxide or hydroxy chloride, silica or alumina, all having a high superficial area. However it is to be noted that the catalytic activity of titanium compounds, on the aforesaid materials as catalyst carriers, depends largely on the chemical nature of the area thereof; therefore these carriers must often be subjected to treatments with Grignard derivatives, aluminum alkyls or hydrogen in order to improve their efficiency.

The present invention relates to a process for the polymerization of alpha-olefins, which uses a catalyst system having high activity and, when used on a catalyst carrier, does not need any preliminary treatment.

This catalyst system is formed by two components:

(1) alkyl-halides, alkyl-derivatives or hydrides of metals belonging to the first three group of the periodic system and (2) the combination product of a transition metal chloride and titanium trichloride, which may be used as such or may be finely dispersed on a material selected from the halides of metals belonging to the 1st and 2nd groups of the periodic system.

This combination product is prepared according to a method which is a third aspect of the present invention and substantially consists in treating a compound of the transition metal with titanium tetrachloride at the boiling temperature thereof, the compounds of the transition metal being in a low valence state, preferably in the zero-valence state.

Particularly when use is made of a catalyst carrier, the inventive method consists in impregnating the carrier, previously dried by a thermal treatment, with a low valence, preferably zero-valence, compound of the transition metal dissolved in a hydrocarbon solvent, and then in refluxing said carrier in titanium tetrachloride and, finally, removing the excess of the latter from the carrier.

On the other hand, when no carrier is used, the aforesaid combination is obtained by simply reacting the transition metal compound with titanium tetrachloride at the boiling temperature thereof, up to the complete evolution of gas. The metal solid, obtained thereby, is filtered and washed to completely eliminate TiCl₄: in such a way we obtain a solid solution of transition metal chloride in titanium trichloride.

The starting compound of transition metal generally is a carbonyl compound although it may contain ligands other than the carbonyl ones, such as allyl, olefin, nitrosyl groups, etc. Preferably use is made of the metal carbonyls as such or partially substituted by halides.

During the process volatile substances are developed, particularly, in the case of metal carbonyls, carbon monoxide, and, contemporaneously, metal is oxidized and titanium tetrachloride is reduced to titanium trichloride according to the reaction

$$M(CO)_p + n\, TiCl_4 \rightarrow M\, Cl_n \cdot n\, TiCl_3 + p\, CO$$

wherein p means the carbonyl number and n the valence state taken by the transition metal M during its oxidation from titanium tetrachloride.

As noted above, the material used as carrier for the aforesaid reaction is selected from the alkali or alkali earth metal halides, while the transition metal is preferably selected from V, Mn, Fe and Co and use is made thereof in an amount varying from 0.1 to 10% by weight with respect to the carrier weight, preferably from 1 to 3% by weight.

Before being employed, these halides are dried and then ground, so as to increase their surface area.

Finally they may also be sieved in order to choose the portion having a predetermined granulometry.

The activities in the polymerization are higher than the ones obtainable by means of the carriers treated only with TiCl₄, under the same conditions.

These catalysts have a good behaviour with respect to hydrogen and, in the case of ethylene polymerization, give rise to a narrow molecular weight range.

The polymerization reaction is carried out according to known methods at temperatures in the range of from 0° to 200° C. and at pressures in the range of from 0.1 to 50 atmospheres.

The polymerization is carried out in a steel autoclave equipped with an anchor stirrer if the operations are carried out at pressures higher than the atmospheric one. The catalyst is fed together with solvent and alkyl metal. After the autoclave has been thermostated at the polymerization temperature, H₂ is fed and then ethylene at the desired pressure ratio.

The reaction is stopped by adding alcohol to the autoclave.

With particular reference to the hereinafter reported examples, the solvent, the metallorganic compound (at a concentration of 0.2% by volume) and the association of transition elements previously prepared as aforesaid, are introduced into the autoclave, thermostated at 85° C. The ethylene pressure is kept constant over the whole test which was carried out for six hours. The following examples refer to these operative conditions ("standard polymerization"). The obtained polymers are dried under vacuum to a constant weight before evaluating the yields.

However the examples, hereinafter reported, only illustrate the invention which is not to be construed as limited thereby.

EXAMPLE 1

10 g of NaCl, finely milled and dried in an oven at 400° C., were refluxed in TiCl$_4$(50 cc) together with Mn$_2$(CO)$_{10}$ (0.5 g) for 6 hours. A product was filtered, washed with ligroin and dried under vacuum, having the following composition Ti = 1.83

Mn = 1.10%

200 mg of this product, employed in a standard polymerization at a polymerization time of 6 hours at $P_{H2}/P_{C2H4}$ = 10/10 produced 278 g of polymer having MF$_{2.16}$ = 0.800, MF$_{21.6}$ = 30.784, MF$_{21.6}$/MF$_{2.16}$ = 38.48 and containing 13.2 ppm as Ti or 21.5 ppm as Ti + Mn.

EXAMPLES 2-5

The catalyst of example 1 was employed in 4 polymerization tests for 2 hours at various values of the H$_2$ and C$_2$H$_4$ partial pressure ratios. The tests are reported in the following table.

| Ex. | Cat | $P_{H2}/P_{C2H4}$ | MF$_{2.16}$ | M$_{21.6}$ | M$_{21.6}$/MF$_{2.16}$ | g polymer | ppm Ti | ppm Mn+Ti |
|---|---|---|---|---|---|---|---|---|
| 2 | 155 | 8/12 | 0.09 | 3.91 | 41.2 | 180 | 15.07 | 25.2 |
| 3 | 265 | 12/8 | 1.42 | 44.99 | 31.7 | 116 | 41.7 | 67 |
| 4 | 321 | 10/5 | 6.234 | 207.66 | 33.3 | 65 | 90 | 145 |
| 5 | 500 | 15/5 | 9.59 | 316.04 | 32.9 | 90 | 105.5 | 161 |

EXAMPLE 6

16.8 g of NaCl, finely milled (the same as in example 1), were refluxed in TiCl$_4$ (50 ml) together with Mn$_2$(CO)$_{10}$ (0.5 g) for 4 hours.

A product was filtered, repeatedly washed with hexane and dried having the following composition Ti = 0.97%

Mn = 0.49%

245 mg of this product were employed in a polymerization test for 2 hours at relative pressures of H$_2$ and C$_2$H$_4$ equal to 8/12 atm.

65 g were obtained of polymer having MF$_{2.16}$ = 0.263, MF$_{21.6}$ = 8.47, MF$_{21.6}$/MF$_{2.16}$ = 32.2 and containing 36.5 ppm of Ti or 55 ppm as Ti + Mn.

EXAMPLE 7

K Cl, finely milled and dried at 400° C. (5 g), were suspended in TiCl$_4$ and refluxed for 4 hours with Mn$_2$(CO)$_{10}$ (0.18 g).

A product was filtered, washed with hexane and dried under vacuum having the following composition Ti = 2.29%

Mn = 0.68%

158 mg of this product were employed in a polymerization for 6 hours at H$_2$/C$_2$H$_4$ relative pressures equal to 8/12 atm. 466 g were obtained of a polymer having MF$_{2.16}$ = 0.331, MF$_{21.6}$ = 11.55, MF$_{21.6}$/MF$_{2.16}$ = 348, and containing 7.77 ppm as Ti and 10.35 ppm as Ti + Mn.

EXAMPLE 8

Mg Cl$_2$ (g 10), previously dried under a HCl stream at 350° C., was refluxed under stirring, in 50 ml of TiCl$_4$ together with Mn$_2$ (CO)$_{10}$ (0.45 g) for 6 hours. After treatments similar to the ones already described, the catalyst had the following composition Ti = 0.90%

Mn = 0.54%

290 mg of this product, employed in a polymerization for 2 hours at $P_{H2}/P_{C2H4}$ equal to 10/5, produced 53 g of polymer having MF$_{2.16}$ = 2.96, MF$_{21.6}$ = 110.6, MF$_{2.16}$ = 37.2, and containing 49.2 ppm as Ti or 78.6 ppm as Mn + Ti.

EXAMPLE 9

5.9 g of K Cl, finely milled and dried, were refluxed with 0.53 g of Mn (CO)$_5$ Cl and 30 cm$^3$ of TiCl for 6 hours.

A product was filtered, washed with ligroin and dried under vacuum, having the following composition Ti = 2.80%

Mn = 1.40%

305 mg of this product, employed in an ethylene polymerization under the same conditions as example 4, produced 190 g of polymer having MF$_{2.16}$ = 8.29, MF$_{21.6}$ = 300.46, MF$_{21.6}$/MF$_{2.16}$ = 36.24, and containing 45 ppm of Ti or also 67 ppm of Ti + Mn.

EXAMPLE 10

292.3 mg of the same product, employed in an ethylene polymerization under the same conditions as example 5, produced 145 g of polymer having MF$_{2.16}$ = 15.23, MF$_{21.6}$ = 453, MF$_{21.6}$/MF$_{2.16}$ = 29.74 and containing 56 ppm of Ti or also 84 ppm of Ti + Mn.

EXAMPLE 11

Mn(CO)$_5$ Cl was prepared by passing a slow chlorine stream through a solution of Mn$_2$ (CO)$_{10}$ in C Cl$_4$ at 0° C., evaporating the volatile portion under vacuum and sublimating at 40° C. and 0.1 mmHg (Abel and Milkinson - J. Chem. Soc. 1501, (1959)). The desired product was obtained having a chlorine amount of 15.37% versus 15.21% of the theoretical value.

The obtained product was reacted with an excess of TiCl$_4$ and boiled to complete evolution of gas (about 16 hours).

A violet solid product was obtained, which was filtered, washed with ligroin in order to remove the excess of TiCl$_4$, dried under vacuum and showed the following elementary analysis

|  | Found | Theoretical for TiCl$_3$ . MnCl$_2$ |
|---|---|---|
| Ti% | 19.25 | 17.11 |
| Mn% | 20.20 | 19.60 |
| Cl% | 60.20 | 63.27 |

The product obtained thereby was utilized for polymerizing ethylene according to the conditions mentioned as "standard polymerization". The results are reported in the following table.

| | | Catalyst system Mn Ti Cl$_5$(without any carrier) - Al (1 But)$_3$ | | | | | | | |
|---|---|---|---|---|---|---|---|---|---|
| Example | Cocatalyst (mg) | P$_{H2}$/P$_{C2H4}$ | Time (h) | MF$_{2.16}$ | Mf$_{21.6}$ | MF$_{21.6}$/MF$_{2.16}$ | Yield (g) | ppm Ti | ppm Ti + Mn |
| 11 | 30.5 | 5/5 | 2 | 1.36 | 49.86 | 36.7 | 165 | 36 | 73 |
| 12 | 16.5 | 5/5 | 6 | 1.27 | 53.6 | 42.2 | 190 | 16 | 33 |
| 13 | 13.4 | 3/7 | 2 | — | 1.53 | — | 110 | 24 | 49 |
| 14 | 18 | 6/4 | 2 | 2.76 | 106.45 | 38.5 | 58 | 60 | 123 |
| 15 | 26.6 | 7/3 | 2 | 3.96 | 165.90 | 41.8 | 75 | 68 | 140 |

What we claim is:

1. A catalyst for the polymerization of an alpha-olefin consisting of a carrier having a high superficial area selected from alkali metal and alkaline earth metal halides; in combination with (a) an alkyl halide of a metal of Groups I–III of the periodic system, an alkyl derivative of Groups I–III of the periodic system or a hydride of a metal belonging to Groups I–III of the periodic system; and (b) a combination product of titanium trichloride and a chloride of another transition metal selected from the group consisting of V, Mn, Co and Fe that is prepared by impregnating said carrier with a solution of a carbonyl of said other transition metal, refluxing the impregnated carrier with titanium tetrachloride to convert said carbonyl into the chloride of said other transition metal and then removing excess titanium tetrachloride.

2. A catalyst according to claim 1 wherein the transition metal constitutes from 0.1 to 10% by weight with respect to the weight of carrier.

3. A catalyst according to claim 2 wherein the transition metal constitutes from 1 to 3% by weight with respect to the weight of carrier.

4. A catalyst according to claim 1 wherein the alkyl derivative of Groups I–III of the periodic system is the tri-isobutyl aluminum and the carbonyl of another transition metal is vanadium carbonyl.

5. A catalyst according to claim 1 wherein the alkyl derivative of Groups I–III of the periodic system is tri-isobutyl aluminum and the carbonyl of another transition metal is manganese carbonyl.

6. A catalyst according to claim 1 wherein the alkyl derivative of Groups I–III of the periodic system is tri-isobutyl aluminum and the carbonyl of another transition metal is cobalt carbonyl.

7. A catalyst according to claim 1 wherein the alkyl derivative of Groups I–III of ther periodic system is tri-isobutyl aluminum and the carbonyl of another transition metal is iron carbonyl.

* * * * *

UNITED STATES PATENT AND TRADEMARK OFFICE
CERTIFICATE OF CORRECTION

PATENT NO. : 4,151,110
DATED : April 24, 1979
INVENTOR(S) : Sevastiano Cesca et al.

It is certified that error appears in the above-identified patent and that said Letters Patent are hereby corrected as shown below:

At column 3, example 4 (line 33), delete the entire line and insert the following under each Table column heading as follows:

Under "Ex", insert --4--
Under "Cat", insert --321
Under $P_{H2}/P_{C2H4}$, insert --10/5--
Under $MF_{2.16}$, insert --6.234--
Under $M_{21.6}$, insert --207.66--
Under $M_{21.6}/MF_{2.16}$, insert --33.3--
Under g polymer, insert --65--
Under ppm Ti, insert --90--
Under ppm Mn + Ti, insert --145--.

Signed and Sealed this

Seventeenth Day of July 1979

[SEAL]

Attest:

Attesting Officer

LUTRELLE F. PARKER
Acting Commissioner of Patents and Trademarks